J. F. MONAHAN.
TRAY FOR BATTERY CELLS.
APPLICATION FILED NOV. 30, 1915.
1,304,588.
Patented May 27, 1919.
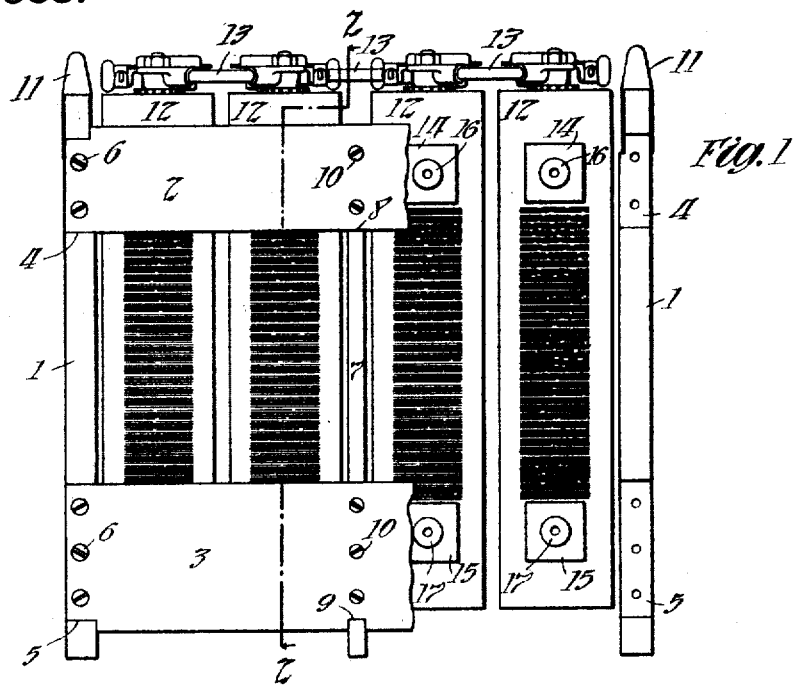
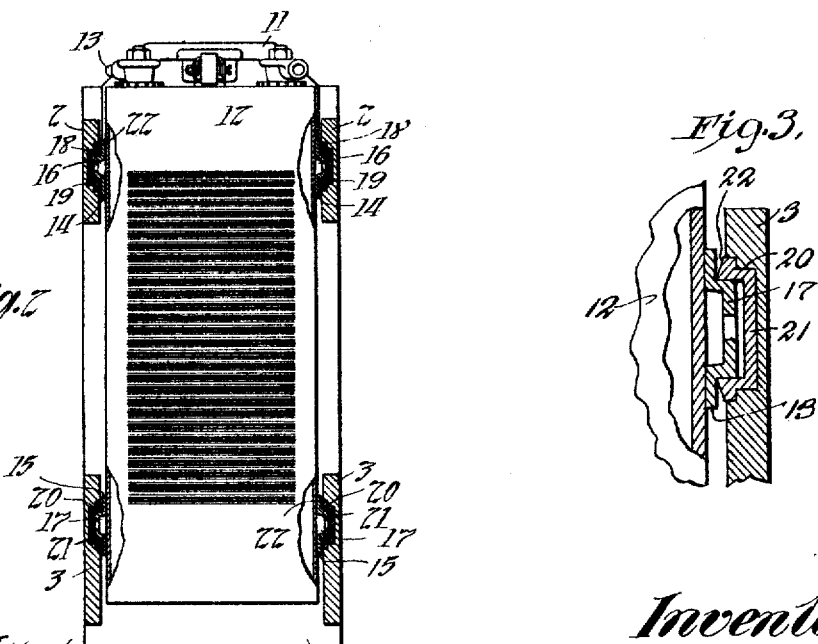
Witnesses:
Jas. M. Gitelstadt.
William A. Hardy.
Inventor:
James F. Monahan
by Dyer & Holden
his Attys:

UNITED STATES PATENT OFFICE.

JAMES F. MONAHAN, OF NEWARK, NEW JERSEY, ASSIGNOR TO EDISON STORAGE BATTERY COMPANY, OF WEST ORANGE, NEW JERSEY, A CORPORATION OF NEW JERSEY.

TRAY FOR BATTERY-CELLS.

1,304,588.     Specification of Letters Patent.     Patented May 27, 1919.

Application filed November 30, 1915. Serial No. 64,207.

*To all whom it may concern:*

Be it known that I, JAMES F. MONAHAN, a citizen of the United States, and a resident of Newark, in the county of Essex and State of New Jersey, have invented a certain new and useful Tray for Battery-Cells, of which the following is a description.

My invention relates to an improved tray or container for supporting and securely holding together a group of battery cells, and to the combination of such a tray and any number of such battery cells supported therein. By the use of my improved tray the handling and assembling of the cells are facilitated, and batteries of any desired number of such groups of cells may be conveniently made up of a number of such trays with their contained cells. Although trays such as described herein, are particularly designed for use in connection with storage battery cells of the Edison type, wherein the battery elements are disposed in an alkaline electrolyte contained in a metallic can or receptacle, it is to be understood that the same are also adapted to be utilized with battery cells of other types.

The principal objects of my invention are to provide a tray of this character which shall be simple, light and cheap to manufacture, and an improved construction for rigidly supporting and securing any desired number of battery cells in a fixed position in the tray, whereby the cells are kept out of contact with each other and with other conducting bodies, and whereby the danger of short circuiting of the cells by reason of the presence of moisture from any cause is practically obviated.

A further object of my invention is to support the cells in the tray in such a manner that adequate spaces for efficient ventilation and cooling are provided on all sides of the cells, and the accumulation of moisture within the tray, especially at the bottom thereof, is prevented.

Other objects and features of my invention will be hereinafter more fully described and claimed.

In order that my invention may be better understood, attention is directed to the drawing accompanying and forming part of this specification, in which like parts are designated by the same reference characters in the several views, and in which—

Figure 1 is a view in side elevation, showing a battery tray or container having a group of four Edison storage battery cells mounted therein in accordance with my invention; and Fig. 2 is a sectional view, partly in elevation, taken on line 2—2 of Fig. 1.

Referring to the drawing, my improved tray comprises a substantially rectangular frame, preferably of wood treated to render it non-absorbent and a better non-conductor, comprising the two end walls 1 and the upper and lower horizontal side strips 2 and 3 rigidly connected at their ends to the end walls 1, as by means of screws 6. The walls 1 are provided at their edges with recesses or cutaway portions 4 and 5 adapted to respectively receive the shouldered end portions of said strips 2 and 3. The recesses 4 and 5 are of such depth that the outer surfaces of the strips 2 and 3 will be flush with the respective edges of the walls 1. The tray is also preferably provided, substantially midway of its ends 1, with a bracing member in the form of a vertical transverse partition 7, the edges of which are recessed adjacent the upper and lower ends, as shown at 8 and 9, to receive the strips 2 and 3, the recesses 8 and 9 being of such depth that the edges of member 7 will be flush with the outer surfaces of the respective pairs of side strips 2 and 3. The strips 2 and 3 and the member 7 are rigidly secured together, as by screws 10. The tray is open at its bottom, and the bottoms of the end walls 1 and member 7 are some distance below the side strips 3. Consequently, there is no danger of an appreciable accumulation of liquid at the bottom of the tray. Each of the end walls 1 is provided at its upper end with a handle 11, suitably secured thereto or which may be formed integrally therewith, whereby the tray and cells supported therein may be conveniently handled.

The drawing illustrates a group of four storage battery cells of the Edison type, having metallic cans or containers 12, mounted side by side in the tray. These cells are electrically connected together in series by means of the usual conductors 13.

Each of the cell containers 12 is provided on the two opposite walls thereof at the sides of the group of cells, with similar upper and lower supporting members 14 and 15, preferably of steel, each of the members 14 comprising an outwardly extending cylindrical lug or boss 16 and a laterally extending flange portion at the inner end of such boss, and each of the members 15 comprising an outwardly extending cylindrical lug or boss 17 and a laterally extending flange portion at the inner end of such boss. The pairs of members 14 and 15 are respectively secured in vertical alinement to the walls of the containers 12, in any suitable manner as by spot welding. The strips 2 and 3 at each side of the tray are provided with four spaced pairs of vertically alined shouldered recesses 18 and 20 in which insulating plugs or buttons 19 and 21, preferably formed of hard rubber, are respectively disposed. The plugs or buttons 19 and 21 extend inwardly beyond the strips 2 and 3 respectively and are provided with cylindrical recesses in which the lugs or bosses 16 and 17 of members 14 and 15 closely engage. In other words, the buttons 19 and 21 and lugs 16 and 17 provide means whereby the cells and tray have articulated engagement. By this construction, it will be apparent that the battery cells are entirely supported from the sides of the tray in a fixed position, so that all movement of the cells, both lateral and vertical, with respect to the tray is effectively prevented. It will also be evident that the arrangement of the cell supporting means is such that the cells are held in spaced relation to each other and to the walls of the tray and are supported with their lower ends a substantial distance above the bottom of the tray, whereby effective ventilation and cooling of the cells is assured and the cell containers will not come into contact with any moisture which may accumulate at the bottom of the tray.

Each of the insulating plugs or buttons 19 and 21 is provided with a flange having a surface 22 surrounding the cylindrical recess therein, and which inclines from such recess toward the side strip of the tray carrying the button. Consequently, the outer edges of the flanges of buttons 19 and 21 are spaced from the adjacent flange portions of members 14 and 15, and there will be little if any danger of the cell containers and the adjacent strips 2 and 3 of the tray being bridged by moisture or other matter which may be present and which may tend to accumulate between the walls of the cells and the tray.

While I have illustrated my invention by showing and specifically describing a preferred embodiment thereof, it is to be understood that such embodiment is subject to various changes in the size, shape and arrangement of its parts without any departure from the spirit of the invention and the scope of the appended claims.

Having now described my invention, what I claim as new and desire to protect by Letters Patent is as follows:—

1. A tray for battery cells, comprising a frame having vertical end and side walls, each of two opposite vertical walls of the tray being provided with means adapted for articulated engagement at a plurality of separated points with a battery cell disposed within the tray, whereby all relative movement of the cell and tray will be prevented, substantially as described.

2. In combination, a tray for battery cells, a battery cell disposed therein, each of two opposite vertical walls of said tray having connection with the adjacent wall of the cell at two separated points, whereby all relative movement of the cell and tray is prevented and whereby said cell is entirely supported from said walls of the tray with its lower end a substantial distance above the bottom of the tray, substantially as described.

3. A tray for battery cells comprising a frame having end walls and side walls rigidly connecting said end walls, each of two opposite walls of the tray being provided with a pair of supporting members of insulating material, one above the other, for entirely supporting a battery cell from the said two opposite walls of the tray, substantially as described.

4. In combination, a tray for battery cells and a battery cell disposed therein, each of two of the opposite vertical walls of the cell being provided with a pair of spaced supporting members, and each of two of the opposite vertical walls of the tray being provided with a pair of supporting members respectively coöperating with said pairs of supporting members of the cell to support the latter entirely from the said two opposite walls of the tray in spaced relation thereto, one set of said supporting members being provided with recesses and the other set having projections respectively engaging said recesses, substantially as described.

5. In combination, a battery cell having a pair of spaced projections on each of two of its opposite vertical walls, and a tray in which said cell is disposed comprising a frame having a pair of opposite end walls and a pair of opposite side walls connecting said end walls, each of one pair of said opposite walls of the tray being provided with a pair of spaced recessed insulating blocks, the recesses of the latter being respectively engaged by one of the said pairs of projections, substantially as described.

6. A tray having means for supporting a battery cell therein, said means comprising a plurality of recessed insulating members secured to certain of the walls of the tray and extending inwardly beyond such walls, said members being adapted to receive in the recesses thereof projections formed on the cell and being respectively provided with flanges surrounding the recesses therein, said flanges being inclined from the recesses toward the respective walls of the tray, substantially as described.

7. The combination with a plurality of cells, of a tray receiving the same, and means connecting the cells with vertical walls of the tray whereby the cells are entirely supported from said walls in a fixed position and with their lower ends a substantial distance above the bottom of the tray and whereby the cells are maintained in position spaced from each other and spaced and insulated from all walls of the tray, substantially as described.

8. A block for supporting a battery cell from a tray therefor, said block being recessed at one end and having a surface about the recess therein which is inclined from such recess toward the other end of the block, substantially as described.

This specification signed and witnessed this 26th day of November, 1915.

JAMES F. MONAHAN.

Witnesses:
WILLIAM A. HARDY,
FREDERICK BACHMANN.

Copies of this patent may be obtained for five cents each, by addressing the "Commissioner of Patents, Washington, D. C."